L. A. Peter,
Horse Power.
No. 108,178.    Patented Oct. 11, 1870.

Witnesses:
Chas. Nida.
L. S. Mabee

Inventor:
L. A. Peters
per Munn & Co.
Attorneys.

United States Patent Office.

LEWIS A. PETER, OF NEFFS, PENNSYLVANIA.

Letters Patent No. 108,178, dated October 11, 1870.

IMPROVEMENT IN HORSE-POWERS.

The Schedule referred to in these Letters Patent and making part of the same.

*To all whom it may concern:*

Be it known that I, LEWIS A. PETER, of Neffs, in the county of Lehigh and State of Pennsylvania, have invented a new and useful Improvement in Horse-Power; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
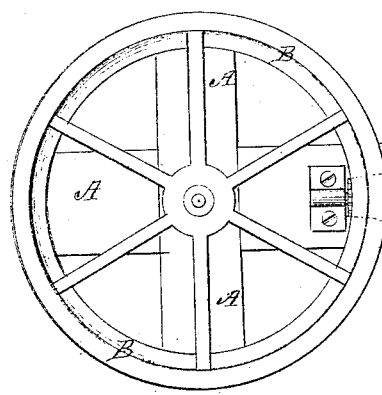
Figure 1 is a top view of my improved horse-power.
Figure 2:
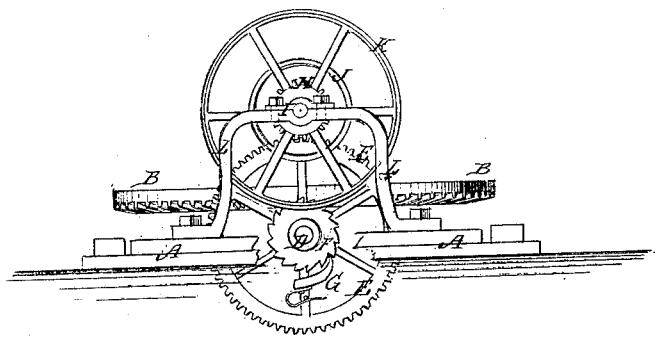
Figure 2 is an end view of the same, part being broken away to show the construction.

My invention has for its object to furnish an improved horse-power, simple in construction, effective in operation, strong, durable, and not liable to get out of order, and which will enable the same amount of work to be done with a less number of horses than the ordinary horse-power; and It consists in the construction and combination of the various parts of the machine, as hereinafter more fully described.

A is the base frame of the machine, to which is attached the operating parts of the machine.

B is the horizontal drive-wheel, to which the power is applied, and which is pivoted to the frame A.

Upon the under side of the rim of the wheel B are formed or to it are attached teeth, which mesh into the teeth of the small pinion or gear-wheel C, attached to the end of the drive-shaft D.

The shaft D revolves in bearings attached to the frame A, and upon it, near its outer end, is placed a gear-wheel, E, which revolves loosely upon the said shaft.

To the end of the shaft D is attached a ratchet-wheel, F, upon the teeth of which the spring pawl G takes hold.

The spring pawl G is attached to the loose wheel E, so that, when the horses are stopped, the operating powers of the machine may move on until the momentum is exhausted; and, when the horses are started, the operating parts of the machine may be at once set in motion.

I is a countershaft, having the driving-pinion H on one end, the fly-wheel K on the other, and the band-wheel J in the middle, and is journaled in bearings upon a frame, A.

The arrangement of these parts, with respect to the others above described, are of the utmost importance to the working of my machine.

Having thus described my invention,

I claim as new and desire to secure by Letters Patent—

The combination, with the mechanism of horse-powers, constructed substantially as described, and drive-shaft D, loose spur-wheel E, ratchet and pawl F G, spur H, countershaft I, and band-wheel J of the fly-wheel K, arranged as and for the purpose described.

LEWIS A. PETER.

Witnesses:
NATHAN PETER,
JOEL P. GEIGER.